US006544918B1

(12) United States Patent
Nagy et al.

(10) Patent No.: US 6,544,918 B1
(45) Date of Patent: Apr. 8, 2003

(54) OLEFIN POLYMERIZATION CATALYSTS CONTAINING CHELATING DIANIONIC LIGANDS

(75) Inventors: Sandor Nagy, Mason, OH (US); Karen L. Neal-Hawkins, Cincinnati, OH (US); Jonathan L. Schuchardt, Royersford, PA (US)

(73) Assignee: Equistar Chemicals, LP, Houston, TX (US)

( * ) Notice: Subject to any disclaimer, the term of this patent is extended or adjusted under 35 U.S.C. 154(b) by 27 days.

(21) Appl. No.: 09/907,180

(22) Filed: Jul. 17, 2001

(51) Int. Cl.$^7$ .............................. B01J 31/00; C07F 7/00; C08F 4/44
(52) U.S. Cl. ..................... 502/103; 502/117; 502/155; 502/158; 526/160; 526/352; 556/12; 556/22; 556/23; 556/52
(58) Field of Search ............................ 556/12, 22, 23, 556/52; 502/103, 117, 155, 158; 526/160, 352

(56) References Cited

U.S. PATENT DOCUMENTS

| 3,009,001 A | 11/1961 | Crain et al. ................. 260/666 |
| 4,008,277 A | 2/1977 | Hewett et al. ............... 260/571 |
| 4,205,000 A | 5/1980 | Kagan ..................... 260/345.2 |
| 4,855,322 A | 8/1989 | Kasha et al. ................. 514/546 |
| 5,132,380 A | 7/1992 | Stevens et al. ............. 526/126 |
| 5,153,157 A | 10/1992 | Hlatky et al. ............... 502/117 |
| 5,198,401 A | 3/1993 | Turner et al. ............... 502/155 |
| 5,241,025 A | 8/1993 | Hlatky et al. ............... 526/129 |
| 5,350,723 A | 9/1994 | Neithamer et al. ......... 502/104 |
| 5,414,180 A | 5/1995 | Geerts et al. ............... 585/525 |
| 5,554,775 A | 9/1996 | Krishnamurti et al. ......... 557/7 |
| 5,637,660 A | 6/1997 | Nagy et al. ................. 526/160 |
| 5,648,440 A | 7/1997 | Sugano et al. ............. 526/132 |
| 5,834,521 A | 11/1998 | Dodd et al. ................. 514/765 |
| 5,902,866 A | 5/1999 | Nagy et al. ................. 526/133 |
| 5,959,132 A | 9/1999 | Jonas et al. ................. 556/15 |
| 6,211,311 B1 | 4/2001 | Wang et al. ................. 526/131 |

OTHER PUBLICATIONS

Fernandez–Galan et al., J. Chem. Soc., Dalton Trans., 2000, 1743–1749, published on the Web May 11, 2000.*
J. March, *Advanced Organic Chemistry*, 2d ed. (1977) 997–998; 1119–1120.
S. Ittel et al., *Chem. Rev. 100* (2000) 1169.
J. Henkel et al., *J. Org. Chem. 46* (1981) 3483.
J. Hane et al., *Tetrahedron Lett. 31* (1990) 2949.
R. Bishop et al., *J. Chem. Soc., Perkin Trans. II* (1982) 1159.
H. Tatemitsu et al., *Bull. Chem. Soc. Japan 48* (1975) 2473.
P. Eaton et al., *Synthesis* (1990) 483.
M. Nee et al., *J. Org. Chem. 46* (1981) 67.
L. Paquette et al., *J. Chem. Soc., Chem. Commun.* (1973) 129.
J. Baldwin et al., *J. Am. Chem. Soc. 93* (1971) 3969.
J. Japenga et al., *Tetrahedron Lett.* (1974) 3805.
P. Freeman et al., *J. Org. Chem. 38* (1973) 3635.
L. Lochmann et al., *Tetrahedron Lett.* (1966) 257.
H. Kneifel et al., *Ang. Chem., I.E. Engl. 12* (1973) 508.
D. Cox et al., *Organometallics 4* (1985) 2001.

* cited by examiner

*Primary Examiner*—Porfirio Nazario-Gonzalez
(74) *Attorney, Agent, or Firm*—Jonathan L. Schuchardt

(57) ABSTRACT

A catalyst system useful for polymerizing olefins is disclosed. The catalyst system comprises an activator and a complex that incorporates a Group 3 to 10 transition metal and at least one chelating dianionic bis(allyl) or bis(benzyl) ligand. The ligands are often easy to make, and they are readily incorporated into transition metal complexes. By modifying the structure of the dianionic ligand, polyolefin makers can control comonomer incorporation, catalyst activity, and polymer properties.

18 Claims, No Drawings

OLEFIN POLYMERIZATION CATALYSTS CONTAINING CHELATING DIANIONIC LIGANDS

FIELD OF THE INVENTION

The invention relates to catalysts useful for olefin polymerization. In particular, the invention relates to transition metal polymerization catalysts that incorporate a chelating dianionic ligand.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Traditional metallocenes incorporate one or more cyclopentadienyl (Cp) or Cp-like anionic ligands such as indenyl, fluorenyl, or the like, that donate pi-electrons to the transition metal. Non-metallocene single-site catalysts have evolved more recently. Some of these include pi-donor heterocyclic ligands that are isolobal to the cyclopentadienide anion, such as boraaryl (see U.S. Pat. No. 5,554,775) or azaborolinyl (U.S. Pat. No. 5,902,866). A different type of non-metallocene single-site catalyst capitalizes on the chelating effect. Two or more n-donor atoms coordinate to a transition metal in these complexes. Examples are 8-quinolinoxy or 2-pyridinoxy ligands (see U.S. Pat. No. 5,637,660) and the bidentate bisimines of Brookhart (see *Chem. Rev.* 100 (2000) 1169). "Constrained geometry" or "open architecture" catalysts (see, for example, U.S. Pat. Nos. 5,132,380 and 5,350,723) are now well known. They are valuable for their ability to incorporate comonomers such as 1-butene, 1-hexene, or 1-octene into polyolefins. Bridging in these complexes is thought to expose the catalytically active site, thereby facilitating monomer complexation and promoting polymer chain growth. In these complexes, the metal is usually sigma-bonded to a linking group that is attached to a cyclopentadienyl ring. The cyclopentadienyl ring, a 6-pi electron donor, complexes with the metal to complete the bridge.

U.S. Pat. No. 5,959,132 describes olefin polymerization catalysts that incorporate a dianionic pentalene ligand. The observed bent geometry of this ligand is not consistent with an aromatic 10-pi electron system, which must be substantially planar, but instead suggests two separate pi-electron donors: (1) an allylic anion (a 4-pi electron donor) that is fused to (2) a cyclopentadienyl anion (a 6-pi electron donor).

A conceptually different approach would utilize a bicyclic ligand to expose the active site, but with pi bonding from two separate allylic anion donor groups. While such an approach has not been explored, the ready availability of suitable ligand precursors makes it an attractive option. Many bicyclic bis(allyl) compounds, such as bicyclic[3.3.1]nona-2,6-dienes, are available commercially or are easily prepared. In spite of their availability, bicyclic bis(allyl) compounds have not been used to produce dianionic transition metal complexes. In contrast, acyclic bis(allyl) dianions are known as ligands for transition metal complexes (see *Organometallics* 4 (1985) 2001). However, these complexes have not been used to polymerize olefins.

The ease with which a variety of interesting acyclic and bicyclic bis(allyl) or bis(benzyl) ligands can be prepared suggests that catalysts with advantages such as higher activity and better control over polyolefin properties are within reach. Ideally, these catalysts would avoid the all-too-common, multi-step syntheses from expensive, hard-to-handle starting materials and reagents.

SUMMARY OF THE INVENTION

The invention is a catalyst system useful for polymerizing olefins. The catalyst system comprises an activator and an organometallic complex. The complex incorporates a Group 3 to 10 transition metal and a chelating bis(allyl) or bis(benzyl) dianionic ligand that is pi-bonded to the metal. The dianionic ligands are often easy to make, and they are readily incorporated into transition metal complexes. By modifying the structure of the chelating dianion, polyolefin makers can control catalyst activity, comonomer incorporation, and polymer properties.

DETAILED DESCRIPTION OF THE INVENTION

Catalyst systems of the invention include an organometallic complex that contains a Group 3-10 transition metal. "Transition metal" as used herein includes, in addition to the main transition group elements, elements of the lanthanide and actinide series. More preferred complexes include a Group 4 or a Group 8 to 10 transition metal.

The organometallic complex includes at least one chelating dianionic ligand. The ligand "chelates" with the transition metal by bonding to it with two separate allylic or benzylic bonds, each of which is a 4-pi electron donor. The ligand is "dianionic," i.e., it has a net charge of −2; each of two electron pairs generated by deprotonation is conjugated with a carbon-carbon double bond.

Suitable chelating ligands include acyclic bis(allyl) and bis(benzyl) dianions. These are generally produced by deprotonating an acyclic diene having allylic and/or benzylic hydrogens. Proton removal generates a resonance-stabilized dianion. "Acyclic" means that the allylic or benzylic anions reside in an open chain of atoms. Preferred acyclic dienes contain two carbon-carbon double bonds that are separated by at least three carbons. Some exemplary acyclic dienes and corresponding dianions:

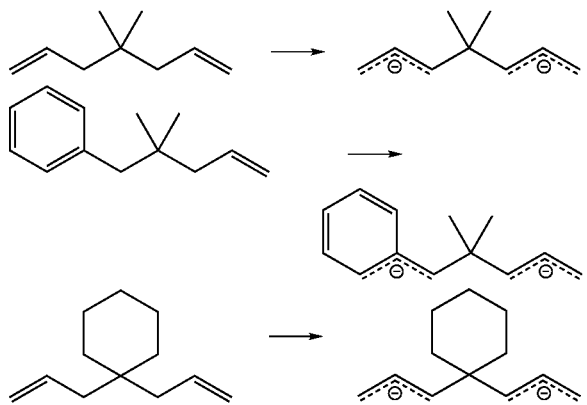

-continued

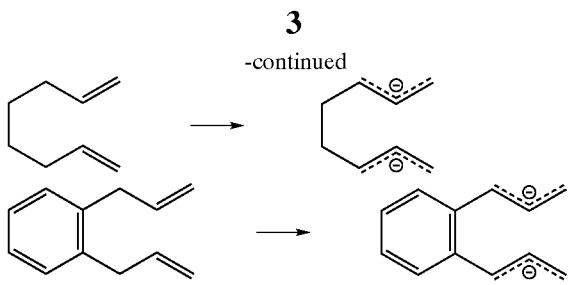

Preferred chelating ligands are bicyclic. "Bicyclic" means that the ligand contains two alicyclic rings that share two bridgehead atoms and from 0 to 3 bridging atoms. In a bicyclic structure, breaking any bond in the main carbon skeleton yields a monocyclic fragment.

The bicyclic dianionic ligands also generally derive from dienes. Each carbon-carbon double bond of the diene is attached to a non-bridgehead carbon that has at least one hydrogen atom attached to it. Proton removal generates a resonance-stabilized allylic or benzylic anion.

Preferred bicyclic dianions originate from a diene having a bicyclic framework of 8 to 15 atoms. The framework includes two bridgehead atoms, which are preferably carbons. The bridgehead atoms are connected to each other through two primary chains, which have x and y atoms, respectively. A bridge of z atoms joins the bridgehead atoms to complete the bicyclic system. Preferably, each of x and y is independently 3 to 5, and z is 0 to 3. The diene groups, which are present within the two longer atom chains, are separated by the bridgehead atoms. Either diene can be part of a benzo-fused system. Thus, the total number of atoms in the bicyclic framework is preferably x+y+z, plus 2 bridgehead atoms, or a maximum of 5+5+3+2=15.

The framework can be substituted with other atoms that do not interfere with formation of the allylic or benzylic dianion or incorporation of the dianion into a transition metal complex. Preferably, the framework is hydrocarbyl.

In an [x.y.0] system, there is no bridging group; the bridgehead atoms are bonded directly to each other. When a bridging group is present (i.e., when z is 1, 2, or 3), it is preferably O, S, NR, PR, $SiR_2$, $CR_2$, $CR_2CR_2$, CR=CR, 1,2-aryl, or $CR_2CR_2CR_2$, in which each R is independently hydrogen or a $C_1$–$C_{30}$ hydrocarbyl group.

The bicyclic framework is preferably fused together such that the hydrogens attached to the bridgehead carbons are "cis" to each other. Generally, an allylic or benzylic dianion produced by deprotonating a "trans"-fused bicyclic diene will lack the ability to chelate to a transition metal.

Preferred bicyclic dianionic ligands have the general structure:

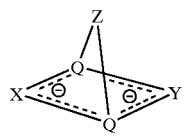

wherein X represents a first chain of 3 to 5 atoms, Y represents a second chain of 3 to 5 atoms, Z represents an optional bridge of 0 to 3 atoms, and each Q is a bridgehead atom. Each of the X and Y chains includes an allylic or benzylic anion. When Z is absent, the bridgehead atoms (Q) are bonded directly to each other.

Suitable bicyclic dienes include, for example, bicyclo[3.3.0]octa-2,6-diene, bicyclo[3.3.1]nona-2,6-diene, bicyclo[3.3.2]deca-2,6-diene, bicyclo[4.4.0]deca-3,8-diene, bicyclo[4.4.2]dodeca-3,8-diene, bicyclo[5.3.0]deca-3,8-diene, bicyclo[5.3.1]undeca-3,8-diene, bicyclo[5.5.0]dodeca-3,9-diene, bicyclo[5.5.1]trideca-3,9-diene, 9-oxabicyclo[3.3.1]nona-2,6-diene, 9-methyl-9-azabicyclo[3.3.1]nona-2,6-diene, and the like. Structures of a few of these illustrative dienes are shown below:

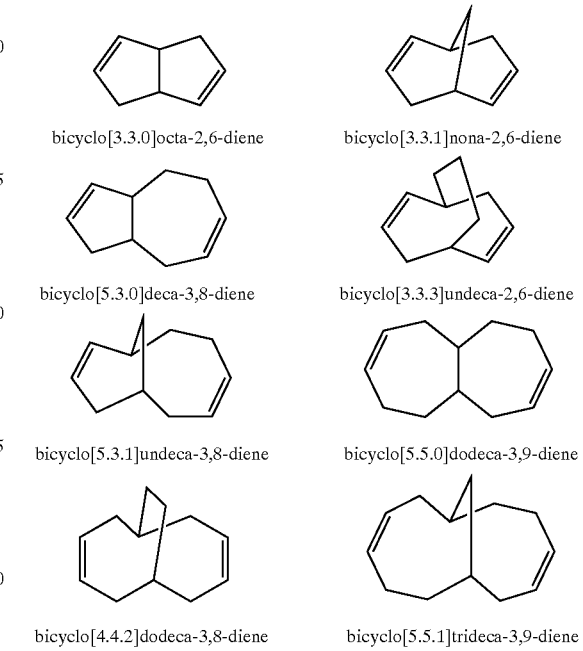

Suitable dienes include benzo-fused dienes that have one or more benzylic hydrogens. In generating these ligands, a benzylic hydrogen is removed instead of or in addition to an allylic hydrogen. A benzene ring stabilizes (by a resonance effect) the resulting anion, which—like the allylic anion—is best viewed as a 4-pi electron donor. Examples are the dibenzo and phenyl-substituted systems shown below:

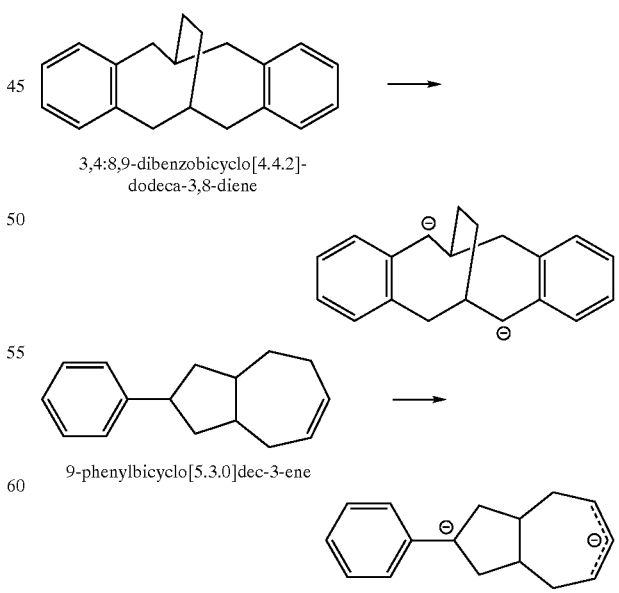

More examples of suitable benzo-fused dienes: 2,3:6,7-dibenzobicyclo[3.3.1]nona-2,6-diene, 3,4:9,10- dibenzobicyclo[5.5.0]dodeca-3,9-diene, 2,3:7,8-dibenzobicyclo[5.3.0]deca-3,8-diene, 13-oxa-3,4:9,10-bicyclo[5.5.1]trideca-3,9-diene, 8,9-benzobicyclo[4.4.2]dodeca-3,8-diene, 2,3:7,8-dibenzobicyclo[5.3.0]deca-3,8-diene, and the like.

Excellent starting materials for producing many bicyclic dianionic ligands are commercially available. Examples are bicyclo[3.3.0]octa-3,7-dione and bicyclo[3.3.1]nona-3,7-dione:

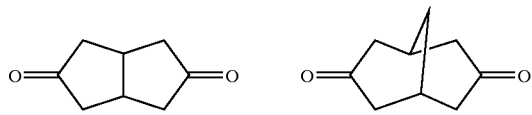

These compounds are readily converted to the corresponding dienes by any desired method. In one approach, the dione is first reduced with two equivalents of a hydride source (such as lithium aluminum hydride) to produce a diol, which is dehydrated under acidic or basic conditions to give the desired bicyclic dienes:

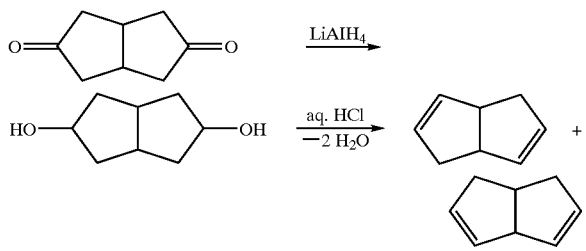

Alternatively, the diol can first be converted to a diester (tosylate or benzoate, e.g.) and then eliminated with a hindered amine such as 1,8-diazabicyclo[5.4.0]undec-7-ene (DBU).

The same bicyclic diketones are easily homologated with diazomethane to provide access to bicyclo[4.4.0] and [4.4.1] frameworks:

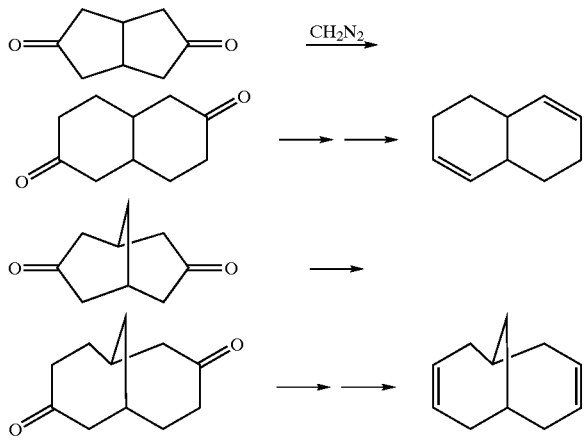

Further homologation with excess diazomethane gives the bicyclo[5.5.0] and [5.5.1] frameworks. See generally J. March, *Advanced Organic Chemistry*, 2d ed. (1977) pp. 997–998, and Example 41 of U.S. Pat. No. 4,855,322.

In addition to using the diketone starting material described above, bicyclo[3.3.0]nonadienes can be made by other known methods starting with cyclooctadiene (see *J. Org. Chem.* 38 (1973) 3636), bicyclo[3.2.1]octa-2,6-diene (*Tetrahedron Lett.* (1974) 3805), the cycloadducts from cyclopentadiene and ketenes (*J. Am. Chem. Soc.* 93 (1971) 3969; *J. Org. Chem.* 46 (1981) 67), or even semibullvalene (*J. Chem. Soc., Chem. Commun.* (1973) 129).

As mentioned above, bicyclo[3.3.1]nonadienes are also conveniently made from bicyclic diketones. For some examples, see *J. Org. Chem.* 46 (1981) 3483 and *J. Chem. Soc., Perkin Trans. II* (1982) 1159. Other starting materials, such as 2-adamantanone (*Tetrahedron Lett.* (1990) 2949), can also be used.

9-Oxabicyclo[3.3.1]nonadienes, which are easily made by acid-catalyzed condensation of phenylacetaldehyde, are also useful bicyclic ligands (see U.S. Pat. No. 4,205,000, the teachings of which are incorporated herein by reference). An alternate route from 1,5-cyclooctadiene is reported elsewhere (*Synthesis* (1990) 483). See also Examples 1–4 below. A simple synthesis of dibenzobicyclo[3.3.1]nonadienes from methyl phenylmalonate is reported in *Bull. Chem. Soc. Japan* 48 (1975) 2473.

As depicted below, U.S. Pat. No. 4,008,277 provides a route to benzobicyclo[3.3.1]nonadienes from beta-tetralones. Enamine preparation with pyrrolidone is followed by Michael addition of the enamine to acrolein and acid-promoted ring closure to give a bicyclo[3.3.1] system. The desired hydrocarbon can be made by well-known methods, including Wolf-Kischner reduction (heating with hydrazine hydrate and base) or conversion of the ketone to a tosyl hydrazone followed by reaction with LiAlH$_4$ or NaBH$_4$ (see J. March, supra, at pp.1119–1120):

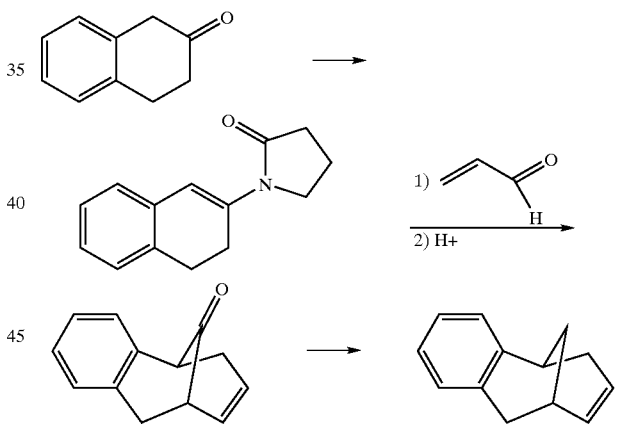

A convenient route to bicyclo[5.5.0]dodecadienes starts with 1,3-butadiene. Trimerization with a Ziegler catalyst gives 1,5,9-cyclododecatriene, which undergoes intramolecular cyclization in the presence of lithium amides to give the bicyclo[5.5.0] system shown below (see U.S. Pat. No. 3,009,001, the teachings of which are incorporated herein by reference). The bridgehead diene is easily converted to bicyclo[5.5.0]dodeca-3,9-diene by conventional allylic bromination with N-bromosuccinimide, catalytic hydrogenation, and dehydrohalogenation with alcoholic potassium hydroxide:

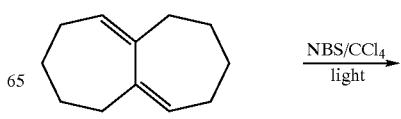

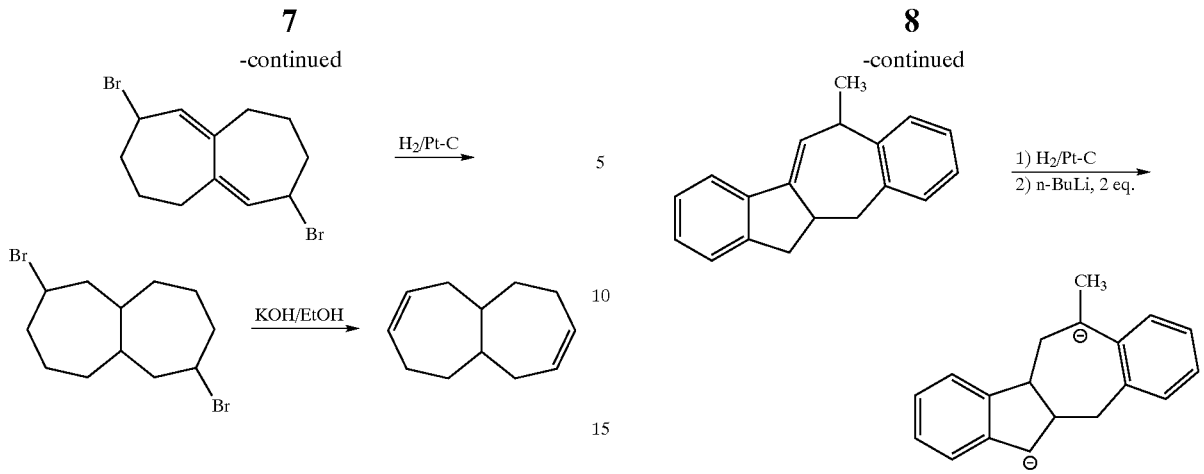

Alternatively, the starting diolefin could be isomerized directly to less-strained diolefin isomers with a trace of a Lewis acid such as boron trifluoride etherate.

The preparation of suitable bicyclo[3.3.3]undecadienes from the known bridgehead diene shown below follows by analogy (see Chem. Abstr. 97 5842p):

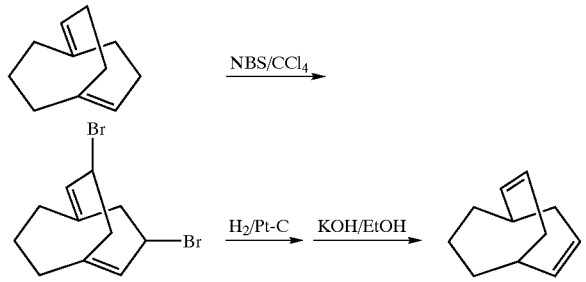

Synthesizing bicyclo[5.3.0] systems, particularly dibenzo compounds, is also straightforward. The interesting approach of U.S. Pat. No. 5,834,521, the teachings of which are incorporated herein by reference, is the basis for the sequence below. The enolate from 1-indanone is alkylated with benzyl bromide. Addition of allyl magnesium bromide to the carbonyl generates an ene-alcohol that is well positioned to undergo p-toluenesulfonic acid-catalyzed cyclization to a [5.3.0] bicyclic system. Catalytic hydrogenation followed by deprotonation with two equivalents of n-butyllithium provides the bicyclic benzylic dianion:

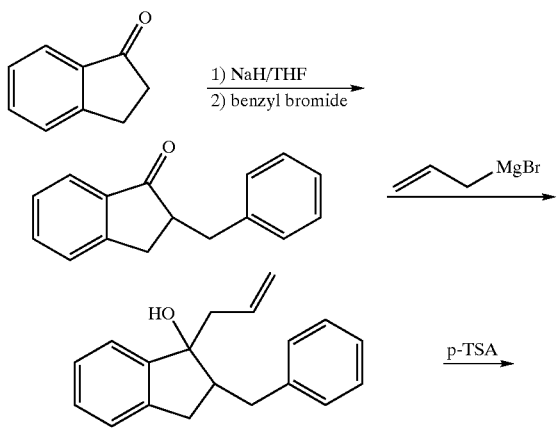

In sum, there are many well-established routes to the various bicyclic dianionic ligands useful herein; the methods discussed at length above are merely illustrative, and those skilled in the art will readily recognize or devise many alternative synthetic methodologies.

Chelating acyclic and bicyclic dianionic ligands are made by doubly deprotonating the corresponding diene or benzo-fused diene with a potent base according to well-known methods. Suitable bases include, for example, alkyllithium compounds (e.g., methyllithium or n-butyllithium), alkali metals (e.g., sodium metal), alkali metal hydrides (e.g., potassium hydride), and Grignard reagents (e.g., methyl magnesium chloride or phenyl magnesium bromide). Particularly preferred deprotonating agents are super-basic reagents prepared by the reaction of alkyllithium compounds and alkali metal t-butoxides, as reported by Schlosser et al. (*Angew. Chem., I.E. Engl.* 12 (1973) 508) and Lochmann et al. (*Tetrahedron Lett.* (1966) 257).

Usually, about two equivalents of the deprotonating agent and about one equivalent of the diene are used to produce the dianionic ligand. Deprotonation can be performed at any suitable temperature, preferably at or below room temperature. While the deprotonation reaction can be performed at temperatures as low as $-78°$ C. or below, it is preferred to perform this step at room temperature.

The bicyclic ligands discussed above donate electrons from two separate 4-pi electron sources that are within the bicyclic framework; in this sense, they are "endocyclic" electron donors. Alternative bicyclic, dianionic bis(allyl) or bis(benzyl) ligands, giving catalyst systems that are still within the scope of this invention, have a pi-electron source residing at least partially outside the bicyclic framework; these are referred to herein as "exocyclic" or "exo" systems.

Consider, for example, the dianion resulting from double deprotonation of 2,4,4,6,8,8-hexamethylbicyclo[3.3.1]nona-2,6-diene. Because the only available non-bridgehead protons reside on the 2- and 6-methyl substituents, only "exo" allylic anions are generated. The anionic centers, however, are well positioned to complex with a transition metal to give an organometallic complex of the invention:

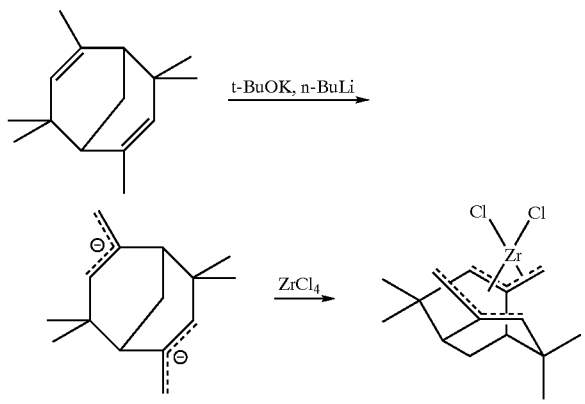

Exo systems can also be generated from terminal olefins, which are themselves easily generated from the corresponding diketones and a phosphorus ylide using the Wittig reaction:

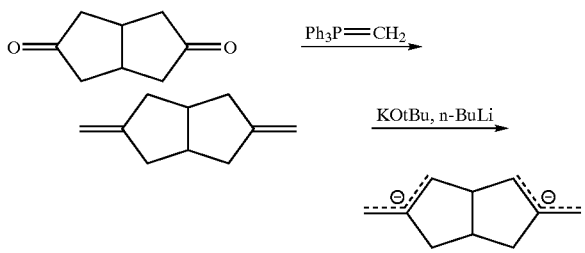

In addition to the chelating acyclic or bicyclic ligand, the organometallic complex may include additional labile anionic ligands such as halides, alkyls, alkaryls, aryls, dialkylaminos, or the like. Particularly preferred are halides, alkyls, and alkaryls (e.g., chloride, methyl, benzyl).

The catalyst system includes an activator. Suitable activators help to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(penta-fluorophenyl) borate, lithium tetrakis(pentafluorophenyl)aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl) borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The optimum amount of activator needed relative to the amount of organometallic complex depends on many factors, including the nature of the complex and activator, whether a supported catalyst is used, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M.

The activator is normally added to the reaction mixture at the start of the polymerization. However, when a supported catalyst system is used, the activator can be deposited onto the support along with the organometallic complex.

The organometallic complex is prepared according to methods that are well known in the art. In general, the complexes are made by combining the dianionic ligand with a transition metal source. Any convenient source of transition metal can be used. For example, the complexes can be made from transition metal halides, alkyls, alkoxides, acetates, amides, or the like. A particularly convenient source of the transition metal is the transition metal halide. For example, one can use titanium tetrachloride, zirconium tetrachloride, vanadium(III) chloride-tetrahydrofuran complex (VCl$_3$(THF)$_3$), titanium (III) chloride-THF complex, chromium(III) chloride-THF complex, cobalt(II) chloride, nickel(II) bromide, platinum(II) chloride, palladium(II) chloride, lanthanum(III) chloride, titanium(III) acetate, or the like. Complexes can also be prepared from salts with labile groups, such as tetrakis(acetonitrile)palladium(II) bis(tetrafluoroborate).

The transition metal complexes are easy to make. Usually, the transition metal source (halide, e.g.) is dissolved or suspended in an organic solvent and the dianionic ligand is carefully added at any desired temperature, preferably from about −78° C. to about room temperature. Refluxing is used if needed to complete the reaction. Insoluble by-products, if any, can be removed by filtration, solvents are evaporated, and the transition metal complex is isolated, washed, and dried. The resulting complex can generally be used without further purification.

The catalyst systems are optionally used with an inorganic solid or organic polymer support. Suitable supports include silica, alumina, silica-aluminas, magnesia, titania, clays, zeolites, or the like. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

The complex and activator can be deposited on the support in any desired manner. For instance, the components can be dissolved in a solvent, combined with a support, and stripped. Alternatively, an incipient-wetness technique can be used. Moreover, the support can simply be introduced into the reactor separately from the complex and activator.

The loading of complex on the support varies depending upon a number of factors, including the identities of the complex and the support, the type of olefin polymerization process used, the reaction conditions, and other concerns.

Usually, the amount of complex used is within the range of about 0.01 to about 10 wt. % of transition metal based on the amount of supported catalyst. A more preferred range is from about 0.1 to about 4 wt. %.

Catalyst systems of the invention are useful for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes.

The olefin polymerizations can be performed over a wide temperature range, such as about –30° C. to about 280° C. A more preferred range is from about 30° C. to about 180° C.; most preferred is the range from about 60° C. to about 100° C. Olefin partial pressures normally range from about 15 psig to about 50,000 psig. More preferred is the range from about 15 psig to about 1000 psig.

The following examples merely illustrate the invention. Those skilled in the art will recognize many variations that are within the spirit of the invention and scope of the claims.

EXAMPLE 1

Zirconium Complex Preparation 2,3:6,7-Dibenzo-9-oxabicyclo[3.3.1]nona-2,6-diene, which has the structure shown below, is prepared by self-condensation of phenylacetaldehyde with fluorosulfonic acid in carbon tetrachloride according to the teachings of Kagan (see U.S. Pat. No. 4,205,000, example 1). (Note: the product is incorrectly numbered as a "1,2,5,6-dibenzo-" compound in the patent; correct numbering starts at a bridgehead carbon.)

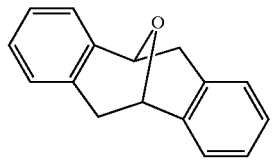

The bicyclo[3.3.1]nonadiene (135 mg, 0.608 mmol) is slurried with hexanes (50 mL) at room temperature, and potassium t-butoxide (136 mg, 1.22 mmol) is added, followed by n-butyllithium (0.61 mL of 2M solution in pentane, 1.22 mmol). The reaction mixture is stirred at room temperature for 20 h, resulting in a dark-violet slurry. Solids are separated and washed several times with hexanes to remove lithium t-butoxide from the desired dianion salt. Zirconium tetrachloride (135 mg, 0.59 mmol) is added to a slurry of the dianion salt in hexanes (40 mL), and the mixture is stirred at room temperature for 16 h. The resulting complex is used without further purification.

EXAMPLE 2

Supporting the Complex

Methyl alumoxane (30% PMAO solution in toluene, product of Albemarle, 1.07 mL) is added slowly to silica (Davison 948 silica, calcined at 250° C. for 4 h prior to use, 2.2 g), and the mixture is stirred at room temperature for 15 min. Separately, a portion of the complex prepared in Example 1 (12 mg) is dissolved in 30% PMAO solution (2.14 mL). This mixture is added using an incipient-wetness technique to the PMAO-treated silica to give a free-flowing solid suitable for use as an olefin polymerization catalyst.

EXAMPLE 3

Ethylene Polymerization

A two-liter reactor is charged with isobutane (900 mL) and a scavenging amount of triisobutylaluminum (1.5 mL of 1 M solution in hexanes, 1.5 mmol). The reactor is heated to 70° C. and pressurized with ethylene to 350 psig. A slurry of the silica-supported catalyst from Example 2 (2.4 g) in isobutane (100 mL) is injected into the reactor to start the polymerization. Ethylene is supplied on demand at 350 psig, and the reaction proceeds at 70° C. for 0.5 h. The reactor is vented, and polyethylene (11 g) is recovered. Activity: 21.5 kg PE/g Zr/h. By gel-permeation chromatography (GPC) analysis, the polymer has a weight average molecular weight (Mw)=1.09×$10^6$. FT-IR spectroscopy analysis indicates no branching in the polymer. DSC melting point: 134.7° C.

EXAMPLE 4

Copolymerization of Ethylene with 1-Butene

A two-liter reactor is charged with hydrogen (20 psig from a 300 mL vessel) followed by isobutane (800 mL), 1-butene (100 mL), and triisobutylaluminum (1.5 mL of 1 M solution in hexanes, 1.5 mmol). The reactor is heated to 70° C. and pressurized with ethylene to 350 psig. A slurry of the silica-supported catalyst from Example 2 (2.54 g) in isobutane (100 mL) is injected into the reactor to start the polymerization. Ethylene is supplied on demand at 350 psig, and the reaction proceeds at 70° C. for 0.5 h. The reactor is vented, and polyethylene (12.9 g) is recovered. Activity: 25.1 kg PE/g Zr/h. GPC Mw=6.66×$10^5$. FT-IR spectroscopy analysis reveals that the polymer contains 18.3 ethyl branches per 1000 carbons, which demonstrates efficient comonomer incorporation. DSC melting point: 128.5° C.

MOLECULAR MODELING STUDY

Additional evidence of the value of chelating, bicyclic bis(allyl) and bis(benzyl) dianions as ligands is provided by a molecular modeling study at the semi-empirical level (PM3tm method, Titan Software). The relative stabilities of the catalytically active sites can be estimated by the difference of the calculated enthalpy (ΔΔH) of a model reaction (illustrated below) involving abstraction of a methyl anion from a zirconium dimethyl complex that incorporates the particular bicyclic ligand versus the control (bis(cyclopentadienyl)-zirconium dimethyl, Example C1 in Table 1). The relative energies of the lowest unoccupied molecular orbitals (LUMO) of the model active sites can be used to estimate their relative reactivities toward the olefins participating in the polymerization.

In the equations below, the enthalpy for eq. 1 is $\Delta H_i$ and the enthalpy for eq. 2 is $\Delta H_o$. The difference ($\Delta H_i - \Delta H_o$)= ΔΔH.

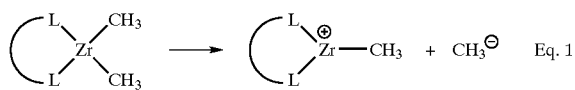

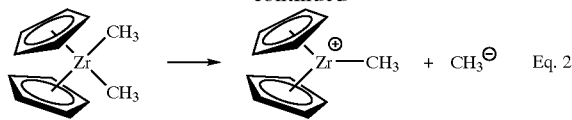

-continued

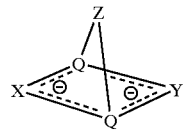 Eq. 2

The results appear in Table 1 (top portion). In general, the LUMO energies are less than −4.5 eV, and the relative stabilities are within 10 kcal/mole of the value calculated for the control, bis(Cp)ZrMe+. Similar results were found for a variety of bicyclic exo systems (bottom of Table 1). Overall, the results suggest that the electronic and steric environments of chelating, bicyclic dianionic ligands are comparable to those of ligands used in conventional metallocenes. Therefore, single-site catalysts that incorporate chelating bicyclic dianions should rival or exceed the performance of typical metallocenes.

TABLE 1

Bicyclic Dianions: "Endo" Systems

| Ex # | Control complex | | | System | LUMO (eV) | Rel. Stab. (kcal/mol) |
|---|---|---|---|---|---|---|
| C1 | Bis(cyclopentadienyl)zirconium dimethyl | | | metallocene | −5.93 | 0 |
| C2 | Ethylene-1,2-bis(indenyl)zirconium dimethyl | | | bridged met. | −5.39 | 0.585 |
| C3 | Dimethylsilyl-1,1-bis(fluorenyl)zirconium dimethyl | | | bridged met. | −4.74 | −7.65 |
| Ex # | Chain X | Chain Y | Chain Z | System | LUMO (eV) | Rel. Stab. (kcal/mol) |
| 4 | CHCHCH | CHCHCH | none | bicyclo[3.3.0] | −5.91 | 6.86 |
| 5 | 1,2-Ph—CH | 1,2-Ph—CH | none | bicyclo[3.3.0] | −5.84 | 9.94 |
| 6 | CHCHCH | CHCHCH | O | bicyclo[3.3.1] | −6.06 | −1.39 |
| 7 | CHCHCH | CHCHCH | $CH_2$ | bicyclo[3.3.1] | −5.85 | −5.63 |
| 8 | CHCHCH | CHCHCH | CH=CH | bicyclo[3.3.2] | −5.84 | 2.82 |
| 9 | CHCHCH | CHCHCH | $(CH_2)_3$ | bicyclo[3.3.3] | −5.74 | 3.34 |
| 10 | $CHCHCHCH_2$ | $CHCHCHCH_2$ | none | bicyclo[4.4.0] | −5.63 | −1.13 |
| 11 | $CHCHCHCH_2$ | $CHCHCHCH_2$ | $CH_2$ | bicyclo[4.4.1] | −5.24 | −13.1 |
| 12 | $CH_2(CH)_3CH_2$ | $CH_2(CH)_3CH_2$ | none | bicyclo[5.5.0] | −4.95 | −5.63 |
| | | "Exo" Systems | | | | |
| 13 | $CH_2CHC(CH_2)$ | $CH_2CHC(CH_2)$ | none | bicyclo[3.3.0] | −5.81 | −4.64 |
| 14 | $CH_2CHC(CH_2)$ | $CH_2CHC(CH_2)$ | $CH_2$ | bicyclo[3.3.1] | −5.65 | −3.31 |
| 15 | $CH_2CHC(CH_2)$ | $CH_2CHC(CH_2)$ | O | bicyclo[3.3.1] | −5.86 | 1.83 |
| 16 | $CH_2CHC(CH_2)$ | $CH_2CHC(CH_2)$ | $CH_2CH_2$ | bicyclo[3.3.2] | −5.62 | −0.664 |
| 17 | $CH_2CHC(CH_2)$ | $CH_2CHC(CH_2)$ | $(CH_2)_3$ | bicyclo[3.3.3] | −5.63 | 1.67 |
| 18 | $CH_2 C(CH_2)CHCH_2$ | $CH_2 C(CH_2)CHCH_2$ | none | bicyclo[4.4.0] | −5.34 | 4.93 |
| 19 | $CH_2 C(CH_2)CHCH_2$ | $CH_2 C(CH_2)CHCH_2$ | $CH_2$ | bicyclo[4.4.1] | −5.30 | 2.45 |
| 20 | $(CH_2)_2C(CH_2)CHCH_2$ | $(CH_2)_2C(CH_2)CHCH_2$ | none | bicyclo[5.5.0] | −5.53 | −3.42 |
| 21 | $(CH_2)_2C(CH_2)CHCH_2$ | $(CH_2)_2C(CH_2)CHCH_2$ | $CH_2$ | bicyclo[5.5.1] | −5.41 | −4.68 |

The preceding example are meant only as illustrations. The following claims define the invention.

We claim:

1. A catalyst system which comprises an activator and an organometallic complex, wherein the complex comprises a Group 3-10 transition metal and at least one bicyclic chelating bis(allyl) or bis(benzyl) dianionic ligand that is pi-bonded to the metal.

2. The catalyst system of claim 1 wherein the activator is selected from the group consisting of alkyl alumoxanes, alkylaluminum compounds, aluminoboronates, organoboranes, ionic borates, and ionic aluminates.

3. The catalyst system of claim 1 wherein the complex includes a Group 4 transition metal.

4. The catalyst system of claim 1 wherein the complex includes a Group 8-10 transition metal.

5. The catalyst system of claim 1 wherein the dianionic ligand has the general structure:

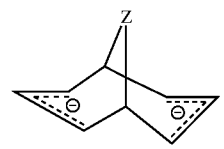

wherein X represents a first chain of 3 to 5 atoms; Y represents a second chain of 3 to 5 atoms, Z represents an optional bridge of 0 to 3 atoms, and each Q is a bridgehead atom; and wherein each of the X and Y chains includes an allylic or benzylic anion.

6. The catalyst system of claim 5 wherein all of the atoms in the X and Y chains are carbons, and each Q is a carbon.

7. The catalyst system of claim 6 wherein all of the atoms in the Z bridge are carbons.

8. The catalyst system of claim 1 wherein the dianionic ligand is produced from a bicyclic diene selected from the group consisting of bicyclo[3.3.0]octadienes, bicyclo[3.3.1]nonadienes, bicyclo[3.3.2]decadienes, bicyclo[4.4.0]decadienes, bicyclo[4.4.1]undecadienes, bicyclo[5.5.0]dodecadienes, bicyclo[5.3.0]decadienes, bicyclo[5.3.1]undecadienes, and bicyclo[5.5.1]tridecadienes.

9. The catalyst system of claim 1 wherein the dianionic ligand has the structure:

wherein Z is an optional bridging group selected from the group consisting of O, S, NR, PR, $SiR_2$, $CR_2$, $CR_2CR_2$, CR=CR, and 1,2-aryl, in which each R is independently hydrogen or a $C_1$–$C_{30}$ hydrocarbyl group.

10. The catalyst system of claim 1 wherein the dianionic ligand has the structure:

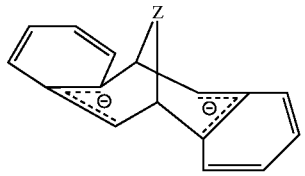

wherein Z is an optional bridging group selected from the group consisting of O, S, NR, PR, $SiR_2$, $CR_2$, $CR_2CR_2$, CR=CR, and 1,2-aryl, in which each R is independently hydrogen or a $C_1$–$C_{30}$ hydrocarbyl group.

11. The catalyst system of claim 1 wherein the organometallic complex has the structure:

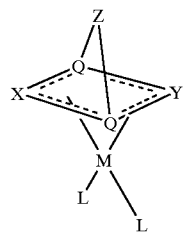

wherein X represents a first chain of 3 to 5 atoms; Y represents a second chain of 3 to 5 atoms, Z represents an optional bridge of 0 to 3 atoms, and each Q is a bridgehead atom;

wherein each of the X and Y chains includes an allylic or benzylic anion; and wherein M is a Group 4 transition metal, and each L is independently a sigma-donor ligand.

12. The catalyst system of claim 11 wherein all of the atoms in the X and Y chains are carbons, and each Q is a carbon.

13. The catalyst system of claim 12 wherein all of the atoms in the Z bridge are carbons.

14. The catalyst system of claim 1 wherein the organometallic complex has the structure:

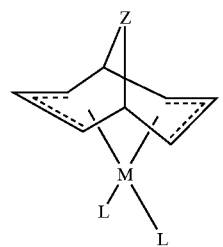

wherein M is a Group 4 transition metal, each L is independently a sigma-donor ligand, and Z is an optional bridging group selected from the group consisting of O, S, NR, PR, $SiR_2$, $CR_2$, $CR_2CR_2$, CR=CR, and 1,2-aryl, in which each R is independently hydrogen or a $C_1$–$C_{30}$ hydrocarbyl group.

15. The catalyst system of claim 1 wherein the organometallic complex has the structure:

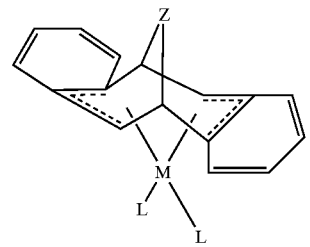

wherein M is a Group 4 transition metal, each L is independently a sigma-donor ligand, and Z is an optional bridging group selected from the group consisting of O, S, NR, PR, $SiR_2$, $CR_2$, $CR_2CR_2$, CR=CR, and 1,2-aryl, in which each R is independently hydrogen or a $C_1$–$C_{30}$ hydrocarbyl group.

16. The catalyst system of claim 1 wherein the chelating ligand contains an exocyclic allylic or benzylic anion.

17. A process which comprises polymerizing an olefin in the presence of the catalyst system of claim 1.

18. A process which comprises polymerizing ethylene with at least one alpha-olefin in the presence of the catalyst system of claim 1.

* * * * *